United States Patent
Ogura et al.

(10) Patent No.: US 6,794,478 B2
(45) Date of Patent: Sep. 21, 2004

(54) PREPARING EPOXY RESIN BY DISTILLING TWO FRACTIONS TO RECOVER AND REUSE EPIHALOHYDRIN WITHOUT GLYCIDOL

(75) Inventors: Ichiro Ogura, Ichihara (JP); Kazuo Arita, Ichihara (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 96 days.

(21) Appl. No.: 10/252,840

(22) Filed: Sep. 24, 2002

(65) Prior Publication Data

US 2003/0073802 A1 Apr. 17, 2003

(30) Foreign Application Priority Data

Sep. 28, 2001 (JP) ........................................ 2001-299797

(51) Int. Cl.$^7$ ........................... C08G 8/28; C08G 59/06; C08G 56/08
(52) U.S. Cl. ........................... 528/95; 525/507; 528/92; 528/97; 528/107
(58) Field of Search .............................. 528/92, 95, 97, 528/107; 525/507

(56) References Cited

U.S. PATENT DOCUMENTS 4,778,863 A * 10/1988 Wang et al. ................ 525/507

FOREIGN PATENT DOCUMENTS

| EP | 0103282 A2 | 3/1984 |
|---|---|---|
| EP | 0467278 A1 | 1/1992 |
| JP | 11-181047 | 7/1999 |
| JP | 2000-72845 | 3/2000 |
| JP | 2000-072845 | 3/2000 |

* cited by examiner

Primary Examiner—Robert Sellers
(74) Attorney, Agent, or Firm—Armstrong, Kratz, Quintos, Hanson & Brooks, LLP

(57) ABSTRACT

A process for preparing an epoxy resin involves the reaction of a polyhydric phenol with an epihalohydrin in a water-soluble solvent in the presence of an alkali reactive catalyst wherein a continuous distillation of the reaction product is conducted to (1) isolate a first recovered fraction containing unreacted epihalohydrin, water-soluble solvent and at most 0.01 part by weight of the by-product glycidol per one part by weight of unreacted epihalohydrin;

(2) isolate a second recovered fraction containing unreacted epihalohydrin, the by-product glycidol and at most 0.01 part by weight of water-soluble organic solvent per one part by weight of unreacted epihalohydrin;

(3) recover the epihalohydrin from the second recovered fraction by washing with water to remove the water-soluble organic solvent and glycidol; and (4) reuse the first recovered fraction and the recovered epihalohydrin from the second recovered fraction as a raw material of the reaction.

3 Claims, No Drawings

PREPARING EPOXY RESIN BY DISTILLING TWO FRACTIONS TO RECOVER AND REUSE EPIHALOHYDRIN WITHOUT GLYCIDOL

BACKGROUND OF THE INVENTION

1. Field of the Invention

The present invention relates to a process for preparing an epoxy resin, which uses a recovered epihalohydrin as a raw material.

2. Description of Related Art

Epoxy resins have been used in various fields of adhesives, paints, laminates, molding materials, and casting materials, including semiconductor sealing materials, because a cured article having excellent mechanical properties, water resistance, chemical resistance, heat resistance, and electrical properties may be obtained by curing using various curing agents.

The epoxy resin is industrially manufactured by a reaction between a phenol compound and an excess amount of epihalohydrin. In the industrial process for manufacturing the epoxy resin, there is generally used a manufacturing system of synthesizing the epoxy resin, recovering epihalohydrin remaining as the unreacted component in the system while distilling, and reusing the recovered epihalohydrin in the following manufacturing batch.

The recovered component mainly containing the epihalohydrin is usually contaminated with glycidol produced by the reaction between the epihalohydrin and an alkali. The glycidol contained in the recovered epihalohydrin decreases the concentration of epoxy groups in the resulting epoxy resin and also reduces electrical characteristics in the field of the semiconductor sealing material. Furthermore, the curing rate during the curing reaction is drastically reduced with the decrease of the concentration of the epoxy group.

Japanese Unexamined Patent Application, First Publication No. 2000-72845 discloses a process of distilling a crude reaction product of a raw phenol compound and epihalohydrin to obtain a first recovered solution containing epihalohydrin, distilling the residue again to secondly recover a fraction containing epihalohydrin, rectifying the second recovered fraction to recover epihalohydrin, mixing this epihalohydrin with the first recovered solution to obtain a recovered epihalohydrin having a low glycidol content, and synthesizing an epoxy resin using the epihalohydrin as a raw material.

As described in Japanese Unexamined Patent Application, First Publication No. 2000-72845, the process of recovering epihalohydrin only by distillation requires a considerable energy cost to reduce the amount of glycidol in the recovered fraction. The process is inferior in industrial-scale productivity because it requires a multi-stage distillation operation, and it is also inferior in reuse efficiency of epihalohydrin because gelation is inevitably caused by the thermopolymerization of epihalohydrin and glycidol contained in the recovered fraction in the rectification step of the recovered fraction and epihalohydrin always remains as a residue in the rectification step of the second recovered fraction.

BRIEF SUMMARY OF THE INVENTION

Therefore, an object of the present invention to be achieved by the present invention is to reduce the energy cost and to remarkably improve the reuse efficiency of epihalohydrin and the industrial productivity in the process for preparing an epoxy resin, which uses a recovered epihalohydrin containing a small amount of glycidol.

The present inventors have intensively researched to achieve the above object and have found that it becomes possible to industrially manufacture an epoxy resin from a recovered epihalohydrin using a simple apparatus without causing any epihalohydrin loss by recovering a first recovered fraction having a low by-product glycidyl content while continuously distilling a distilled fraction from the crude reaction product after the completion of the reaction, recovering a second recovered fraction having a low water-soluble organic solvent content, washing the second recovered fraction with water to obtain a purified fraction, and using the purified fraction as a raw material for synthesis of the epoxy resin, together with the first recovered fraction in the process for preparing an epoxy resin by reacting a polyhydric phenol compound with epihalohydrin in a water-soluble organic solvent in the presence of an alkali reactive catalyst. Thus, the present invention has been completed.

The present invention provides a process for preparing an epoxy resin by reacting a polyhydric phenol compound with epihalohydrin in a water-soluble organic solvent in the presence of an alkali reactive catalyst, which comprises the steps of:

(1) continuously distilling a distilled component from a crude reaction product obtained by the reaction to recover a first recovered fraction containing the water-soluble organic solvent, an unreacted epihalohydrin, and a by-product glycidol in an amount of 0.01 parts by weight or less based on 1 part by weight of the unreacted epihalohydrin;

(2) continuously distilling a distilled component to recover a second recovered fraction containing the by-product glycidol, the unreacted epihalohydrin, and the water-soluble organic solvent in an amount of 0.1 parts by weight or less based on 1 part by weight of the unreacted epihalohydrin;

(3) recovering the epihalohydrin by washing the second recovered fraction with water to remove the water-soluble organic solvent and the by-product glycidol from the second recovered fraction; and (4) reusing the first recovered fraction and the recovered epihalohydrin as a raw material of the reaction.

According to the present invention, it is made possible to reduce the energy cost and to remarkably improve the reuse efficiency of epihalohydrin and the industrial productivity in the process for preparing an epoxy resin, which uses a recovered epihalohydrin having a low glycidol content.

DETAILED DESCRIPTION OF THE INVENTION

Examples of the polyhydric phenol compound used in the process of the present invention include ortho-cresol novolak resin, phenol novolak resin, brominated phenol novolak resin, alkylphenol novolak resin, polycondensate of phenols and hydroxybenzaldehyde, naphthol novolak resin, polyadduct of phenols and dicyclopentadiene, bisphenol A, bisphenol F, tetrabromobisphenol A, biphenol, tetramethylbiphenol, binaphthol and dihydroxynaphthalene. Among these compounds, cresol novolak, binaphthol, dihydroxynaphthalene, or a polyadduct of phenols and dicyclopentadiene is preferred because an epoxy resin thereof having excellent heat resistance, water resistance and soldering cracking resistance is obtained in purposes such as semiconductor sealing materials.

Examples of epihalohydrin to be reacted with the polyhydric alcohol include epichlorohydrin and epibromohydrin. Among these compounds, epichlorohydrin is preferred in view of the availability. The process of the present invention uses virgin epihalohydrin as the entire epihalohydrin to be charged in a first batch for manufacturing an epoxy resin, but uses epihalohydrin recovered from the crude reaction product in combination with virgin epihalohydrin corresponding to epihalohydrin to be consumed during the reaction and epihalohydrin to be lost during the purification, in batches which follow the first batch.

The reaction between the polyhydric alcohol and epichlorohydrin is carried out in the presence of a water-soluble organic solvent. The reaction rate during the synthesis of the epoxy resin can be enhanced by using the water-soluble organic solvent. Examples of the water-soluble organic solvent include ketones such as acetone and methyl ethyl ketone; alcohols such as methanol, ethanol, 1-propyl alcohol, isopropyl alcohol, 1-butanol, secondary butanol and tertiary butanol; cellosolves such as methylcellosolve and ethylcellosolve; ethers such as tetrahydrofuran, 1,4-dioxane, 1,3-dioxane and diethoxyethane; and aprotic polar solvents such as acetonitrile, dimethyl sulfoxide and dimethylformamide. These water-soluble organic solvents may be used alone, or two or more kinds of them may be used in combination to adjust the polarity.

Among these solvents, a water-soluble organic solvent having a boiling point at normal pressure (0.101 MPa) of 120° C. or less is particularly preferred because the residual amount in the second recovered fraction decreases. Since the water-soluble organic solvent has high affinity with glycidol and epihalohydrin, when a large amount of the water-soluble organic solvent exists in the second recovered fraction, epihalohydrin is likely to disappear during the step of washing with water, together with glycidol. Therefore, the use of the solvent having a boiling point of 120° C. or less makes it possible to nearly completely recover the water-soluble organic solvent in the first recovered fraction and to reduce the residual amount in the second recovered fraction, and thus glycidol can be effectively removed without losing epihalohydrin during washing the second recovered fraction with water.

Examples of the water-soluble organic solvent having a boiling point of 120° C. or less include acetone, methyl ethyl ketone, methanol, ethanol, 1-propyl alcohol, isopropyl alcohol, 1-butanol, secondary butanol, tertiary butanol, tetrahydrofuran, 1,4-dioxane, 1,3-dioxane and acetonitrile. Among these solvents, tertiary butanol, 1,4-dioxane or acetonitrile is particularly preferred because the amount of chlorine contaminant in the epoxy resin finally obtained can be reduced and an epoxy resin having higher purity can be obtained.

Examples of the alkali reactive catalyst include alkali earth metal oxide, alkali metal carbonate, and alkali metal hydroxide. Among these catalysts, alkali metal hydroxide is particularly preferred because it is superior in catalyst activity of the reaction for synthesis of an epoxy resin. Specific examples of the alkali metal hydroxide include sodium hydroxide, potassium hydroxide, and calcium hydroxide. These alkali metal hydroxides may be used in the form of an aqueous solution having a concentration of about 10 to 55% by weight, or in the form of a solid.

In the process for preparing an epoxy resin by reacting a polyhydric phenol compound with epihalohydrin in a water-soluble organic solvent in the presence of an alkali reactive catalyst, epihalohydrin and the water-soluble organic solvent are introduced in a reaction vessel equipped with a stirring blade therein in a batch-wise reaction apparatus to obtain a mixed liquid, and a polyhydric phenol compound is dissolved in the mixed liquid to obtain a mixed solution, and then a predetermined amount of an alkali metal hydroxide is added thereto, thus making it possible to react the mixture. As described hereinafter, after the completion of the reaction, the crude reaction product is preferably subjected to the step (1) and the step (2) using the reaction apparatus. Therefore, the reaction apparatus is preferably provided with a vapor exhaust port. As epihalohydrin and the water-soluble organic solvent, virgin materials are used in the first batch and recovered material is reused in the following batches. In this case, together with the recovered material, virgin epihalohydrin and virgin water-soluble organic solvent are added in the reaction system in amounts corresponding to the amounts of the recovered epihalohydrin and the recovered water-soluble organic solvent which will be lost during the reaction and purification.

The amount of the aqueous organic solvent to be used is preferably from 5 to 80 parts by weight based on 100 parts by weight of epihalohydrin because the reaction rate of the reaction for synthesis of the epoxy resin increases. The amount of epihalohydrin is not specifically limited, but is an excess amount based on the polyhydric alcohol. The amount is appropriately selected according to the desired molecular weight, but is preferably 2 to 15 mol per mol of a phenolic hydroxyl group in the purposes of semiconductor sealing materials for the purpose of achieving a low melt viscosity.

The reaction is preferably carried out by gradually adding an alkali metal hydroxide to the mixed solution in an amount within a range from 0.7 to 1.5 mol based on 1 mol of the phenolic hydroxyl group of the polyhydric phenol compound at a temperature at which the temperature of the liquid phase is from 20 to 100° C. The crude reaction product thus obtained may be subjected to distillation in the following step, as it is, so as to recover the first recovered fraction and the second recovered fraction. Since the crude reaction product contains a large amount of an inorganic salt produced immediately after the reaction, the inorganic salt is preferably removed by fractionating after adding water in an amount required to dissolve the resulting inorganic salt. In this step, the operation of the addition of the alkali metal hydroxide, the reaction and the removal of the inorganic salt thus obtained is preferably carried out repeatedly in several portions (e.g. 2 to 5 portions) for the purpose of improving the volume efficiency of the reactor.

The first recovered fraction and the second recovered fraction are recovered from the crude reaction product in the following distillation steps (1) and (2).

(1) A distilled component is continuously distilled from a crude reaction product to recover a first recovered fraction containing a water-soluble organic solvent, an unreacted epihalohydrin and a by-product glycidol in an amount of 0.01 parts by weight or less based on 1 part by weight of the unreacted epihalohydrin.

(2) Furthermore, a distilled component is continuously distilled to recover a second recovered fraction containing the by-product glycidol, the unreacted epihalohydrin and the water-soluble organic solvent in an amount of 0.1 parts by weight or less based on 1 part by weight of the unreacted epihalohydrin.

In the steps (1) and (2), although the distilled component is continuously distilled, the fraction contains the water-soluble organic solvent and the unreacted epihalohydrin as a main component in an initial stage, while the fraction contains the unreacted epihalohydrin and the by-product glycidol as a main component in a latter stage. Therefore, in the present invention, the first recovered fraction and the second recovered fraction are separated by changing the recovery container so that the by-product glycidol content in the first recovered fraction is 0.01 parts by weight or less based on 1 part by weight of the unreacted epihalohydrin and the content of the water-soluble organic solvent in the recovered fraction is 0.1 parts by weight or less based on 1 part by weight of the unreacted epihalohydrin in the second recovered fraction.

Concrete means for carrying out the steps (1) and (2) includes, for example, a process of heating a crude reaction product as it is in the reaction apparatus and discharging vapor out of the system, or a process of removing a crude product from the reaction vessel, introducing the crude product into a general distillation column, or a thin film distillation apparatus represented by falling film evaporator, rising film evaporator, or wiped film evaporator, and carrying out a distillation treatment. In the present invention, since epihalohydrin can be recovered satisfactorily even if the temperature conditions and pressure conditions of the distillation are relatively mild conditions, a distillation column for exclusive use is not required and a process of carrying out the distillation using the former reaction apparatus used to synthesize the epoxy resin is preferred in view of the manufacturing cost.

The step (1) and the step (2) can be concretely carried out under the following pressure conditions and temperature conditions when using a water-soluble organic solvent having a boiling point of 120° C. or less.

First, the crude reaction product is distilled while increasing the temperature of the liquid phase to a temperature, which is 30 to 60° C. higher than the boiling point of the water-soluble organic solvent, under the pressure conditions of 0.08 to 0.12 MPa, and then the first recovered fraction is recovered. In this step, by distilling the crude reaction product while increasing the temperature of the liquid phase up to the above temperature conditions under a pressure close to normal pressure, the water-soluble organic solvent can be recovered nearly completely in a state where glycidol does not substantially exist in the first recovered fraction.

In the step (1), heated vapor discharged from the reaction apparatus is concentrated and cooled in a condenser, and is thus recovered as the first recovered fraction in an appropriate container in the form of a liquid. As used herein, the boiling point of the water-soluble organic solvent in this step refers to a boiling point at normal pressure (0.101 MPa). In the step (1), the temperature of the liquid phase is more preferably increased to the temperature, which is 45 to 60° C. higher than the boiling point of the water-soluble organic solvent, under the pressure conditions of 0.08 to 0.12 MPa, because good recovery of epihalohydrin is attained.

As the final temperature of the liquid phase in the step (1), the preferred temperature of the liquid phase is selected from a range of temperatures which 30 to 60° C., particularly 45 to 60° C., higher than the boiling point of the water-soluble organic solvent so that the composition of the first recovered fraction and that of the second recovered fraction meet the conditions described above.

In the recovery step of the first recovered fraction, by slowly increasing the temperature of the liquid phase, the ability to isolate glycidol, the unreacted epichlorohydrin, and the water-soluble organic solvent is improved and the effect of reducing the glycidol content in the fraction becomes remarkable. Therefore, the heating rate of the liquid phase is preferably within a range from 0.1 to 1.0° C./min from the beginning of the distillation of the first fraction to the final temperature.

At the time when the temperature of the liquid phase reaches the set temperature, the recovery container is replaced by another container and the second recovered fraction is recovered while maintaining the temperature of the liquid phase within a range of temperatures which is 30 to 60° C. higher than the boiling point of the water-soluble organic solvent, preferably the set temperature ±5° C., and reducing the pressure of the vapor phase to 0.1 to 6 kPa. AS used herein, the boiling point of the water-soluble organic solvent refers to a boiling point at normal pressure (0.101 MPa).

Among the first recovered fraction and the second recovered fraction thus recovered, the first recovered fraction preferably has a by-product glycidol content of 0.01 parts by weight or less, and particularly 0.007 parts by weight or less, based on 1 part by weight of the unreacted epihalohydrin, as described above.

As described above, the second recovered fraction preferably has a water-soluble organic solvent content of 0.1 parts by weight, and particularly 0.05 parts by weight or less, based on 1 part by weight of the unreacted epihalohydrin. Since the second recovered fraction contains a small amount of the water-soluble organic solvent, a good oil-water separation state can be obtained in the following step of washing with water and good efficiency of removing the by-product glycidol is attained.

Although a weight ratio of the first recovered fraction to the second recovered fraction is not specifically limited, a weight ratio of the first recovered fraction to the second recovered fraction, (first recovered fraction/second recovered fraction), is preferably within a range from 45/55 to 95/5 because the purification efficiency, taking into account the step duration and energy cost, is enhanced.

After the completion of the step (2), a considerable amount of an inorganic salt remains in the residue and the resulting epoxy resin sometimes has a halohydrin group. In such a case, the residue is washed with water to remove the inorganic salt and then the residue is dissolved in a hydrophobic organic solvent such as toluene or methyl isobutyl ketone and is subjected to an alkali treatment, and thus the halohydrin group is cyclized to form epoxy groups and the concentration of epoxy groups in the resin can be enhanced.

The process of the alkali treatment includes, for example, a process of adding 1 to 49% by weight of caustic soda or caustic potash and, if necessary, a phase transfer catalyst such as quaternary ammonium salt or polyalkylene glycol and reacting them until the concentration of the halogen contaminant is reduced to the desired concentration. After the completion of the alkali treatment, the atmosphere in the system is optionally neutralized and the treatment such as dehydration precise filtration is carried out, and then the organic solvent is recovered by distillation, and thus the objective epoxy resin can be obtained.

In the step (3), the second recovered fraction is washed with water to remove the water-soluble organic solvent and the by-product glycidol to recover epihalohydrin from the second recovered fraction.

This step of washing with water can be carried out concretely in a batch-wise washing process or a column type extraction process. The batch-wise washing process is a process of contacting the fraction, recovered in the container 2, and water with stirring and removing glycidol by extracting by liquid separation. When using the batch-wise washing process, extraction is preferably carried out 1 to 10 times at a temperature ranging from 5 to 100° C. using water in an amount which is 0.05 to 2 times as much as the weight of the recovered fraction, in view of excellent washing effect. The column type extraction process includes, for example, a process of extracting with contacting the fraction and water in the column using a cross-flow type extraction column. In the column type extraction process, water is fed into a column in an amount by weight, which is 0.01 to 1 times as much as the amount of the fraction per unit time, and the extraction is carried out in the column at a temperature within a range of from 5 to 100° C. Concretely, washing is preferably carried out until the amount of glycidol is reduced to 0.3 parts by weight or less, and more preferably 0.1 parts by weight or less, based on 100 parts by weight of epihalohydrin.

In the step (4), the first recovered fraction and recovered epihalohydrin thus recovered are reused as raw materials for preparation of the epoxy resin. The first recovered fraction and the recovered epihalohydrin are used as the epihalohydrin and the water-soluble organic solvent in the preparation of the epoxy resin by reacting the polyhydric phenol compound and epihalohydrin in the water-soluble organic solvent in the presence of the alkali reactive catalyst.

In the present invention, since the amount of glycidol is sufficiently reduced, an epoxy resin having a high concentration of epoxy groups can be prepared even if the first recovered fraction and recovered epihalohydrin thus recovered are reused as raw materials. For example, a general cresol novolak type epoxy resin for use as a semiconductor sealing material has a theoretic epoxy equivalent of 175 to 178 g/eq., while a cresol novolak type epoxy resin, which is now used in practice, has a high epoxy equivalent of about 193 to 220 g/eq. To the contrary, the epoxy resin prepared in the present invention has an epoxy equivalent corresponding to the theoretic epoxy equivalent.

In the case in which the epoxy resin is prepared by reusing the first recovered fraction and the recovered epihalohydrin, virgin epihalohydrin and virgin water-soluble organic solvent are added in the reaction system in an amount corresponding to the amount of the recovered epihalohydrin and the recovered water-soluble organic solvent and the amount to be consumed or lost. According to the present invention, there is provided a system for manufacturing an epoxy resin, which is superior in reuse efficiency of a raw material, because the first recovered fraction and the recovered epihalohydrin are obtained at a high recovery without causing deterioration of the quality. For example, the recovery of epihalohydrin in the present invention is 90% by weight or more, excluding the amount to be consumed during the reaction.

EXAMPLES

The following Examples and Comparative Examples illustrate the process of the present invention in detail, but the present invention is not limited to the Examples. The measuring conditions of properties in the tables and the meaning of abbreviations are as follows.

Glycidol Content and Water-soluble Organic Solvent Content

The glycidol content and the water-soluble organic solvent content are values determined by gas chromatography.

Epichlorohydrin Loss

The epichlorohydrin loss means the amount (% by weight) of epichlorohydrin to be lost in the step 3 based on the entire amount of epichlorohydrin to be recovered in the steps 1 to 3.

Entire Chlorine Content

The entire chlorine content means the concentration of entire chlorine atoms in an epoxy resin, which is determined by dissolving 0.2 g of the epoxy resin in 20 ml of 1-butanol, adding 1 g of metallic sodium, subjecting to a heat treatment under reflux at 120° C. for 3 hours, thereby eliminating chlorine ions, and performing potentiometric titration of chlorine ions using a silver nitrate solution.

Ratio of Epoxy Equivalent to Theoretic Epoxy Resin Equivalent

The ratio of an epoxy equivalent to a theoretic epoxy resin equivalent is a ratio of an actually measured epoxy equivalent to the theoretic epoxy resin equivalent. As the value becomes smaller, the epoxy equivalent of the resulting epoxy resin becomes closer to the theoretic epoxy equivalent.

Glycidol Content in Fraction (A)

The glycidol content in the fraction (A) means an amount (parts by weight) of glycidyl based on 1 part by weight of the unreacted epihalohydrin in the fraction (A).

Water-soluble Organic Solvent Content in Fraction (B)

The water-soluble organic solvent content in the fraction (B) means an amount (parts by weight) of the water-soluble organic solvent based on 1 part by weight of the unreacted epihalohydrin in the fraction (B).

Glycidol Content in Purified Fraction (B')

The glycidol content in the purified fraction (B') means an amount (parts by weight) of glycidol based on 1 part of the unreacted epihalohydrin in the purified fraction (B').

Explanation of Abbreviations

IPA: isopropyl alcohol t-BuOH: tertiary butyl alcohol

AN: acetonitrile

Examples 1 to 8 and Comparative Examples 1 to 3

Preparation of Epoxy Resin

In a reaction apparatus equipped with a heater, a stirrer, a condenser, and a thermometer, and a separatory faucet at a lower portion, a water-soluble organic solvent was added to a polyhydric phenol compound and epichlorohydrin (in each amount shown in Tables 1 to 3) in an amount of 30 parts by weight based on 100 parts by weight of epichlorohydrin.

Then, an aqueous 35 wt % potassium hydroxide solution was added in an amount shown in Tables 1 to 3 in two portions. First, 10% by weight of the total amount of the potassium hydroxide solution was added at 40° C., followed by stirring for 4 hours while being maintained at 40° C. After heating to 50° C., 90% by weight of the rest of the potassium hydroxide solution was added dropwise over 3 hours while being maintained at 50° C. After stirring at 50° C. for 30 minutes, water was added, thereby dissolving the resulting salt to obtain a saturated solution of the salt. Then, stirring was terminated and the aqueous layer was discarded.

Step 1

The unreacted epichlorohydrin was heated to a temperature (referred to as "temperature set in step 1" in the table) shown in Tables 1 to 3 at a heating rate shown in Tables 1 to 3 and a fraction (A) was recovered.

Step 2

While maintaining the temperature and reducing the pressure to 1.3 kPa, a fraction (B) was recovered in another container to obtain a crude reaction product.

Step 3

In a reaction apparatus equipped with a heater, a stirrer, a condenser, and a thermometer, and a separatory faucet at a lower portion, the fraction (B) obtained in the step 2 was charged and water was also charged in an amount of 20 parts by weight based on 100 parts by weight of the fraction (B) and, after contacting with stirring at 30° C. for 10 minutes and washing with water, the fraction (B) and water were separated. This operation was repeated three times to obtain a purified fraction (B') containing glycidol in an amount based on epichlorohydrin shown in Tables 1 to 3.

The fraction (A) obtained in the step 1 was mixed with the purified fraction (B') obtained in the step 2 to obtain a mixed fraction.

Post-treatment of Crude Reaction Product

To the crude reaction product obtained in the step 2, a 1.5-fold amount (by volume) of methyl isobutyl ketone was added, thereby dissolving the crude reaction product, and 50 parts by weight of n-butanol and 12 parts by weight of an aqueous 10% sodium hydroxide solution were added, followed by stirring at 80° C. for 2 hours and further liquid separation. After neutralization with sodium primary phosphate, azeotropic distillation and further precise filtration, methyl isobutyl ketone was distilled off to obtain each of epoxy resins having epoxy equivalents shown in Tables 1 to 3.

Comparative Example 4

In the same manner as in Example 2, an epoxy resin was synthesized and epichlorohydrin was recovered under the conditions of 0.02 MPa and 90° C.

The recovery of epichlorohydrin was 83.2% by weight and the amount of glycidol in the recovered component was 0.009 parts by weight based on 1 part by weight of the recovered epichlorohydrin.

Comparative Example 5

In the same manner as in Example 2, an epoxy resin was synthesized and epichlorohydrin was recovered under the conditions of 0.02 MPa and 90° C. The residue was distilled under the conditions of 1.3 kPa and 185° C. The resulting fraction was rectified under the conditions of 0.02 MPa and 69° C., and then epichlorohydrin was recovered and mixed with the component recovered immediately after synthesizing the epoxy resin.

The recovery of epichlorohydrin was 88.0% by weight and the amount of glycidol in the recovered component was 0.008 parts by weight based on 1 part by weight of the recovered epichlorohydrin.

TABLE 1

| Example No. | 1 | 2 | 3 | 4 |
|---|---|---|---|---|
| Polyhydric phenol compound | Ortho-cresol novolak resin | | | |
| Parts by weight | 120 | 120 | 120 | 120 |
| Virgin epichlorohydrin | 833 | 833 | 463 | 463 |
| Water-soluble organic solvent | 1,4-dioxolane | | IPA | |
| Heating rate (° C./min) | 0.5 | 0.5 | 0.5 | 0.5 |
| Temperature (° C.) set in step 1 | 118 | 130 | 115 | 130 |
| (A)/(B) | 50/50 | 73/27 | 50/50 | 74/26 |
| Glycidol content in fraction (A) | 0.003 | 0.006 | 0.003 | 0.005 |
| Water-soluble organic solvent content in fraction (B) | 0.041 | 0.003 | 0.045 | 0.004 |
| Glycidol content in purified fraction (B') | 0.001 | not detected | 0.001 | not detected |
| ECH recovery, % by weight | 92.3 | 96.1 | 92.3 | 95.9 |
| ECH loss, % by weight | 7.7% | 3.9% | 7.7% | 4.1% |
| Glycidol content in mixed fraction, % by weight | 0.3% | 0.5% | 0.3% | 0.4% |

TABLE 2

| Example No. | 5 | 6 | 7 | 8 |
|---|---|---|---|---|
| Kind of polyhydric phenol compound | Ortho-cresol novolak resin | | Phenol-dicyclopentadiene polyadduct | |
| Parts by weight | 120 | 120 | 170 | 170 |
| Virgin epichlorohydrin | 925 | 1200 | 833 | 463 |
| Water-soluble organic solvent | t-BuOH | AN | 1,4-dioxane | IPA |
| Heating rate (° C./min) | 0.5 | 0.5 | 0.5 | 0.5 |
| Temperature (° C.) set in step 1 | 130 | 130 | 130 | 130 |
| (A)/(B) | 75/25 | 72/28 | 75/25 | 75/25 |
| Glycidol content in fraction (A) | 0.003 | 0.004 | 0.006 | 0.005 |
| Water-soluble organic solvent content in fraction (B) | 0.003 | 0.001 | 0.003 | 0.004 |
| Glycidol content in purified fraction (B') | not detected | not detected | not detected | not detected |
| ECH recovery, % by weight | 96.0 | 95.9 | 96.1 | 96.0 |
| ECH loss, % by weight | 4.0% | 4.1% | 3.9% | 4.0% |
| Glycidol content in mixed fraction, % by weight | 0.3% | 0.4% | 0.4% | 0.4% |

TABLE 3

| Comparative Example No. | 1 | 2 | 3 |
|---|---|---|---|
| Polyhydric phenol compound | Ortho-cresol novolak resin | | |
| Parts by weight | 120 | 120 | 120 |
| Virgin epichlorohydrin | 833 | 463 | 463 |
| Water-soluble organic solvent | 1,4-dioxolane | IPA | IPA |
| Heating rate (° C./min) | 0.5 | 0.5 | 0.5 |
| Temperature (° C.) set in step 1 | 105 | 103 | 160 |
| (A)/(B) | 44/56 | 44/56 | 96/4 |
| Glycidol content in fraction (A) | 0.001 | 0.001 | 0.016 |
| Water-soluble organic solvent content in fraction (B) | 0.212 | 0.218 | not detected |
| Glycidol content in purified fraction (B') | 0.013 | 0.012 | not detected |
| ECH recovery, % by weight | 84.6% | 84.8% | 99.9% |
| ECH loss, % by weight | 15.4% | 15.2% | 0.1% |
| Glycidol content in mixed fraction, % by weight | 0.7% | 0.8% | 1.5% |

Examples 9 to 16

The same operation as in Examples 1 to 8 was repeated, except that a mixture of virgin epichlorohydrin and reused epichlorohydrin was used as the epichlorohydrin, objective epoxy resins were obtained in accordance with the conditions shown in Table 4 and Table 5. The reused epichlorohydrin was used in an amount, which corresponds to each amount of the epichlorohydrin component shown in Table 4 and Table 5, determined by calculating from the purity measured by gas chromatography.

TABLE 4

| Example No. | 9 | 10 | 11 | 12 |
|---|---|---|---|---|
| Polyhydric phenol compound | Ortho-cresol novolak resin | | | |
| Parts by weight | 120 | 120 | 120 | 120 |
| Virgin epichlorohydrin, parts by weight | 111 | 111 | 111 | 111 |
| Reused epichlorohydrin, Example No. | 1 | 2 | 3 | 4 |
| Amount, parts by weight | 722 | 722 | 352 | 352 |
| Kind of water-soluble organic solvent | 1,4-dioxane | | Isopropyl alcohol | |
| Epoxy equivalent (g/eq.) | 197 | 197 | 196 | 197 |
| Ratio of epoxy equivalent to theoretic epoxy equivalent | 1.12 | 1.12 | 1.11 | 1.12 |
| Entire chlorine content (ppm) | 720 | 710 | 890 | 890 |

TABLE 5

| Example No. | 13 | 14 | 15 | 16 |
|---|---|---|---|---|
| Polyhydric phenol compound | Ortho-cresol novolak resin | | Phenol-dicyclopentadiene polyadduct | |
| Parts by weight | 120 | 120 | 170 | 170 |
| Virgin epichlorohydrin, parts by weight | 111 | 111 | 111 | 111 |
| Reused epichlorohydrin, Example No. | 5 | 6 | 7 | 8 |
| Amount, parts by weight | 816 | 1089 | 722 | 352 |
| Kind of water-soluble organic solvent | t-BuOH | AN | 1,4-dioxane | IPA |

TABLE 5-continued

| Example No. | 13 | 14 | 15 | 16 |
|---|---|---|---|---|
| Epoxy equivalent (g/eq.) | 198 | 198 | 254 | 252 |
| Ratio of epoxy equivalent to theoretic epoxy equivalent | 1.13 | 1.13 | 1.12 | 1.12 |
| Entire chlorine content (ppm) | 790 | 620 | 710 | 890 |

What is claimed is:

1. A process for preparing an epoxy resin by reacting a polyhydric phenol compound with epihalohydrin in a water-soluble organic solvent in the presence of an alkali reactive catalyst, which comprises the steps of:
   (1) continuously distilling a distilled component from a crude reaction product obtained by the reaction to recover a first recovered fraction containing the water-soluble organic solvent, an unreacted epihalohydrin, and a by-product glycidol in an amount of 0.01 parts by weight or less based on 1 part by weight of the unreacted epihalohydrin;
   (2) continuously distilling a distilled component to recover a second recovered fraction containing the by-product glycidol, the unreacted epihalohydrin, and the water-soluble organic solvent in an amount of 0.1 parts by weight or less based on 1 part by weight of the unreacted epihalohydrin;
   (3) recovering the epihalohydrin by washing the second recovered fraction with water to remove the water-soluble organic solvent and the by-product glycidol from the second recovered fraction; and
   (4) reusing the first recovered fraction and the recovered epihalohydrin as a raw material of the reaction.

2. The process according to claim 1, wherein the water-soluble organic solvent has a boiling point of 120° C. or less.

3. The process according to claim 2, wherein the first recovered fraction is recovered while heating under the conditions of a pressure of 0.08 to 0.12 MPa until the temperature of the liquid phase reaches a temperature, which is 30 to 60° C. higher than the boiling point of the water-soluble organic solvent, and the second recovered fraction is recovered while maintaining the temperature of the liquid phase at the temperature, which is 30 to 60° C. higher than the boiling point of the water-soluble organic solvent, and reducing the pressure of the vapor phase to 0.1 to 6 kPa.

* * * * *